(12) United States Patent
Neporada et al.

(10) Patent No.: US 10,203,905 B2
(45) Date of Patent: *Feb. 12, 2019

(54) SYSTEM AND METHOD FOR INCREMENTALLY PERFORMING FULL DATA BACKUP

(71) Applicant: Acronis International GmbH, Schaffhausen (CH)

(72) Inventors: Andrei Neporada, Dolgoprudny (RU); Vladimir Simonov, Moscow (RU); Stanislav Protasov, Moscow (RU); Mark Shmulevich, Moscow (RU); Serguei Beloussov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 255 days.

This patent is subject to a terminal disclaimer.

(21) Appl. No.: 15/183,014

(22) Filed: Jun. 15, 2016

(65) Prior Publication Data

US 2017/0192683 A1    Jul. 6, 2017

Related U.S. Application Data

(63) Continuation of application No. 14/987,128, filed on Jan. 4, 2016, now Pat. No. 9,501,234.

(51) Int. Cl.
*G06F 12/00* (2006.01)
*G06F 3/06* (2006.01)
*G06F 11/14* (2006.01)
*G06F 11/00* (2006.01)

(52) U.S. Cl.
CPC .............. *G06F 3/065* (2013.01); *G06F 3/061* (2013.01); *G06F 3/0605* (2013.01); *G06F 3/067* (2013.01); *G06F 3/0619* (2013.01); *G06F 3/0644* (2013.01); *G06F 11/00* (2013.01); *G06F 11/14* (2013.01)

(58) Field of Classification Search
None
See application file for complete search history.

(56) References Cited

U.S. PATENT DOCUMENTS

| | | | |
|---|---|---|---|
| 8,175,418 B1 | 5/2012 | Keith, Jr. | |
| 8,433,863 B1* | 4/2013 | Orcutt | G06F 11/1458 707/646 |
| 9,501,234 B1* | 11/2016 | Neporada | G06F 11/14 |

* cited by examiner

*Primary Examiner* — Daniel D Tsui
(74) *Attorney, Agent, or Firm* — Arent Fox LLP; Michael Fainberg

(57) ABSTRACT

A system and method is disclosed for performing a backup of electronic data. An example method includes storing a first incremental data backup of a dataset that is less than a complete backup of the dataset and includes unmodified and modified portions of the dataset. Then, a second incremental data backup of the dataset is stored that includes a second unmodified portion of the dataset different than the first unmodified portion. The method then determines whether the first and second incremental data backups together form the complete backup of the dataset. If they do not, the method further stores a subsequent incremental data backup of the dataset in the electronic memory that includes an additional unmodified portion of the dataset and/or an additional modified portion of the dataset.

15 Claims, 7 Drawing Sheets

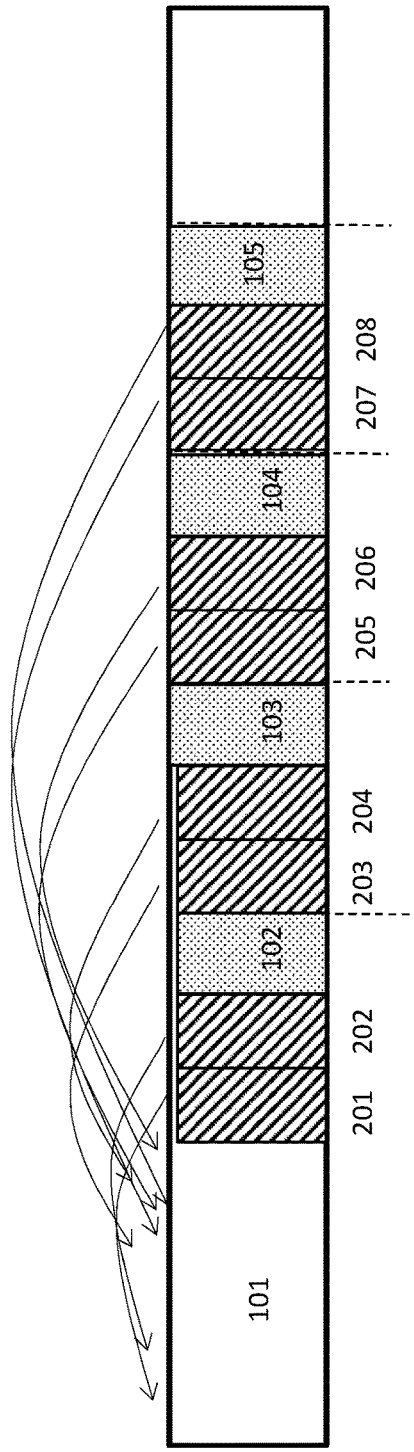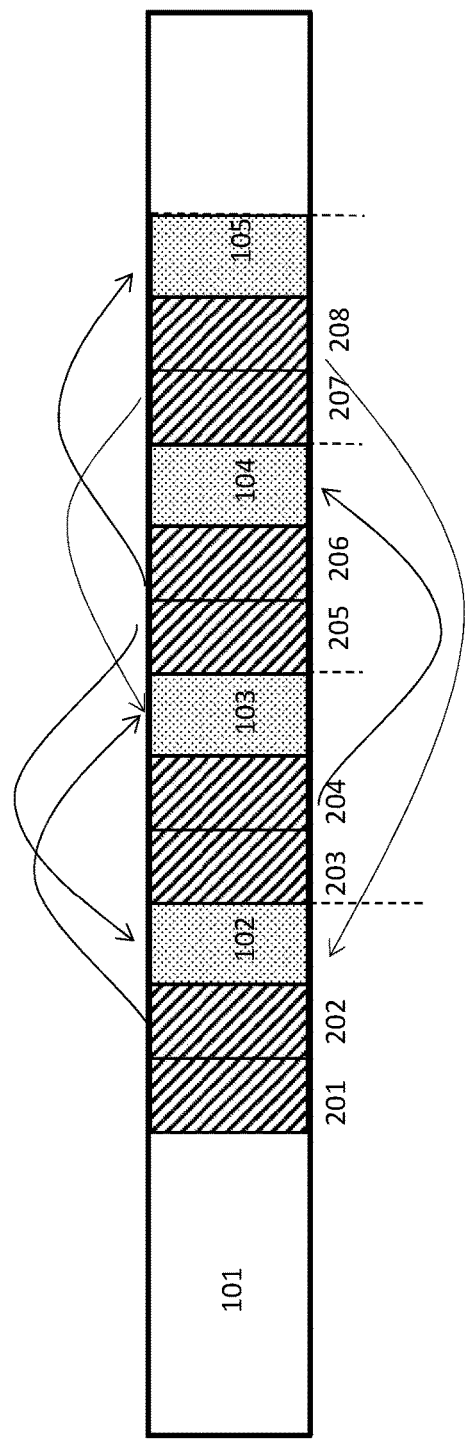

SYSTEM AND METHOD FOR INCREMENTALLY PERFORMING FULL DATA BACKUP

CROSS REFERENCE TO RELATED APPLICATIONS

The present application is a continuation application of U.S. patent application Ser. No. 14/987,128, filed Jan. 4, 2016, the entire contents of which are incorporated herein by reference.

FIELD OF TECHNOLOGY

The present disclosure generally relates to the field of electronic data backup, and, more specifically, to a system and method for incrementally performing a full data backup

BACKGROUND

Many systems for backing up a set of user data use a method in which a full backup is performed initially by copying all of the dataset to be backed up to a storage device and then performing subsequent "incremental" backup operations. These operations are "incremental" in that they involve copying only data that has been added to or changed in the dataset since the last incremental backup. In other words, in the subsequent incremental backups, only modified or newly added data (blocks or files) are sent to the storage device for backup in the archive.

One benefit of this type of conventional incremental backup is that the typical amount of data that is transferred during an incremental backup is far less than the amount of data that would be transferred in a full backup. This result can be significant as it can be very time-consuming to perform a full backup of the dataset especially if it is performed using remote online storage, such as a data cloud.

One technical disadvantage of the conventional incremental backup method described above is the possible threat to data integrity in the archive. In particular, recovery of the dataset through creation of an updated version of the full dataset requires data from all of the intervening incremental backups performed since the last full backup. In other words, reconstituting the full dataset requires data from the entire chain of backups, starting from the initial full backup and ending at the last incremental backup (closest in time to the point at which the recovery of the data is planned). If data from even one of incremental backups is damaged, successful recovery of the full chain after the point at which the data was damaged becomes impossible.

Moreover, it should be understood that the risk of interim backup data being damaged will increase as the number of interim data backups increases. Moreover, since many data storage systems can have hundreds or even thousands of incremental backups, the potential risk for lack of data integrity is severe. This risk is compounded by the risk of damage not only to the segments of the chain of incremental backups, but to the initial full backup as well, making it virtually impossible to recover all data from beginning to end using standard methods.

Some conventional systems perform a periodic full backup of the dataset to reduce the risk of data loss due to accidental damage to some extent. However, as noted above, the large amount of data to be backed up as well as the limited speed of data communication channels makes frequent full backups problematic and capable of imposing a substantial burden on backup infrastructure and communication channels.

Accordingly, there is a need for a system and method for backing up data that reduces the risk that recovery will become impossible while at the same time reducing the need for periodic full backups.

SUMMARY

The present disclosure provides an effective solution for the foregoing problems of creating backup copies of electronic data. Disclosed are example systems, methods and computer program products for incrementally performing a data backup.

In one aspect, an exemplary method is disclosed for performing a backup of electronic data. According to this aspect, the method includes storing a first incremental data backup of a first portion of a dataset in an electronic memory, the first incremental data backup of the first portion being less than a complete backup of the dataset and including at least a first unmodified portion of the dataset and a first modified portion of the dataset; storing a second incremental data backup of a second portion of the dataset in the electronic memory, the second incremental data backup including at least a second unmodified portion of the dataset different than the first unmodified portion of the dataset; determining, by a processor, whether the first and second incremental data backups together comprise the complete backup of the dataset; and if the first and second incremental data backups do not comprise the complete backup of the dataset, storing at least one subsequent incremental data backup of a subsequent portion of the dataset in the electronic memory, the at least one subsequent incremental data backup including at least one of an additional unmodified portion of the dataset and an additional modified portion of the dataset.

According to another aspect, the method includes storing an initial complete backup of the dataset in the electronic memory prior to storing the first incremental data backup of the first portion of the dataset in the electronic memory.

According to another aspect, the storing of the first incremental data backup of the first portion of the dataset in the electronic memory comprises appending the first incremental data backup to the initial complete backup of the dataset.

According to another aspect, the additional modified portion of the dataset that is stored as part of the at least one subsequent incremental data backup in the electronic memory is determined after the storing of the first and second incremental data backups of the dataset in the electronic memory.

According to another aspect, the method includes determining, by the processor, whether the first and second incremental data backups and the at least one subsequent incremental data backup comprise the complete backup of the dataset.

According to another aspect, the method includes deleting the initial complete backup of the dataset from the electronic memory if the first and second incremental data backups and the at least one subsequent incremental data backup comprise the complete backup of the dataset.

According to another aspect, the second incremental data backup further includes a second modified portion of the dataset and the at least one subsequent incremental data backup includes both the additional unmodified portion of the dataset and the additional modified portion of the dataset.

According to another aspect, the method includes associating the first, second and additional modified portions of the dataset with the initial complete backup of the dataset in the electronic memory until the processor determines that the first and second incremental data backups and the at least one subsequent incremental data backup comprise the complete backup of the dataset; and associating the first, second and additional modified portions of the dataset with the first, second and additional unmodified portions of the dataset when the processor determines that the first and second incremental data backups and the at least one subsequent incremental data backup comprise the complete backup of the dataset.

According to another aspect, a system is provided for performing a backup of electronic data. According to this aspect, the system includes an electronic memory; and a processor configured to store a first incremental data backup of a first portion of a dataset in an electronic memory, the first incremental data backup of the first portion being less than a complete backup of the dataset and including at least a first unmodified portion of the dataset and a first modified portion of the dataset, store a second incremental data backup of a second portion of the dataset in the electronic memory, the second incremental data backup including at least a second unmodified portion of the dataset different than the first unmodified portion of the dataset, determine whether the first and second incremental data backups together comprise the complete backup of the dataset, and if the first and second incremental data backups do not comprise the complete backup of the dataset, store at least one subsequent incremental data backup of a subsequent portion of the dataset in the electronic memory, the at least one subsequent incremental data backup including at least one of an additional unmodified portion of the dataset and an additional modified portion of the dataset.

According to another aspect, a non-transitory computer readable medium storing computer executable instructions is provided for performing a backup of electronic data. According to this aspect, instructions are provided for storing a first incremental data backup of a first portion of a dataset in an electronic memory, the first incremental data backup of the first portion being less than a complete backup of the dataset and including at least a first unmodified portion of the dataset and a first modified portion of the dataset; storing a second incremental data backup of a second portion of the dataset in the electronic memory, the second incremental data backup including at least a second unmodified portion of the dataset different than the first unmodified portion of the dataset; determining whether the first and second incremental data backups together comprise the complete backup of the dataset; and if the first and second incremental data backups do not comprise the complete backup of the dataset, storing at least one subsequent incremental data backup of a subsequent portion of the dataset in the electronic memory, the at least one subsequent incremental data backup including at least one of an additional unmodified portion of the dataset and an additional modified portion of the dataset.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 4A and 4B illustrate the memory of the archive storage before and after the incremental data backup is complete according to an exemplary aspect.

DETAILED DESCRIPTION

Figure 1A:
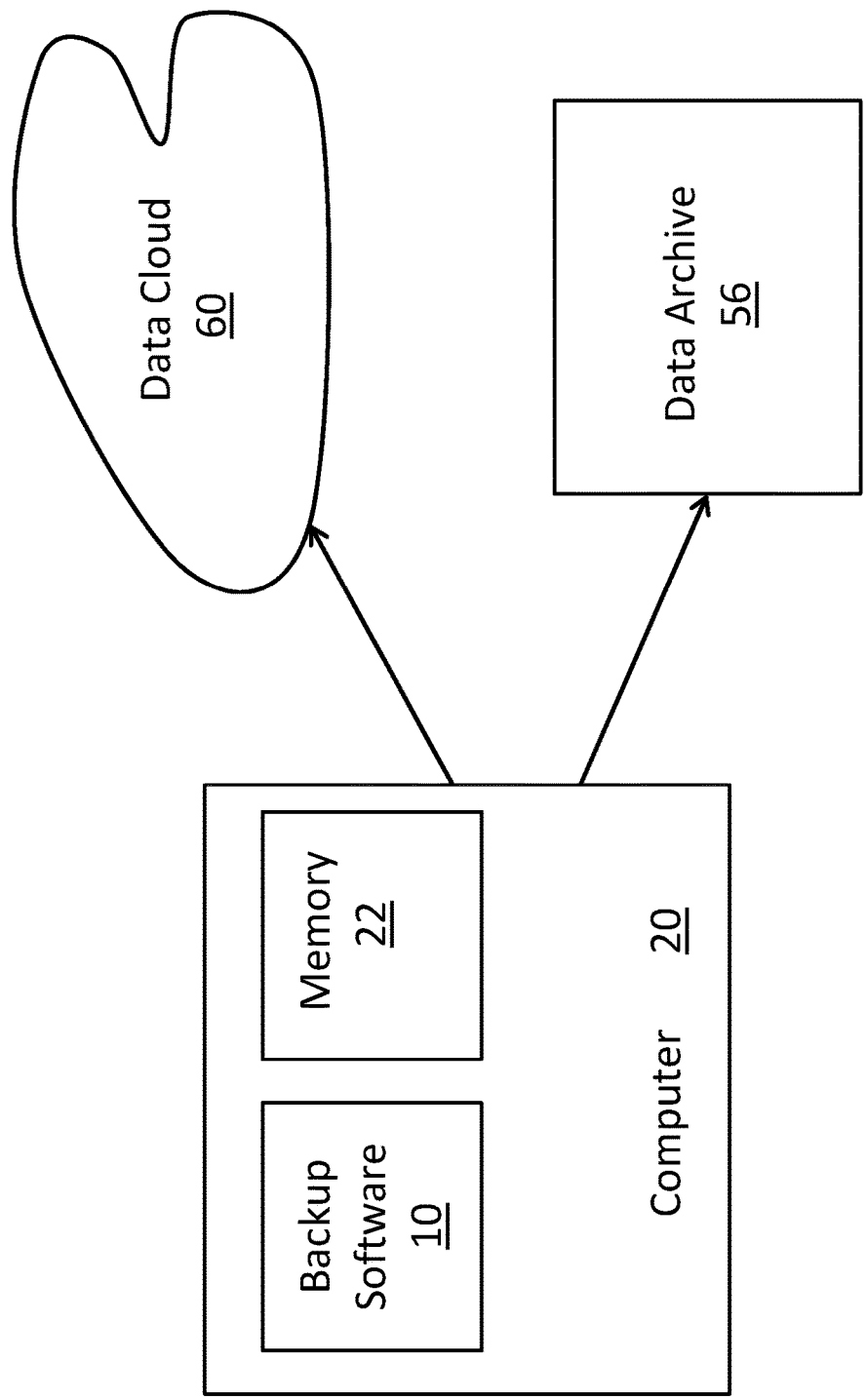
FIG. 1A illustrates a system for incrementally performing a data backup according to an exemplary aspect.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments. The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments.

FIG. 1A illustrates a system for incrementally performing a data backup according to an exemplary aspect. As shown, a computer 20 comprises backup software 10 and a memory 22 containing electronic data (e.g., user data) to be backed up. The memory 22 may be any type of device for storing digital information such as a hard drive, flash memory, disk, or tape. A more detailed explanation of a general purpose computer for implementing the disclosed system and method will be described below with respect to FIG. 6. The backup software 10 may include a software application installed on the computer 20 and executable by a hardware processor of the computer 20, such as central processing unit 21 of FIG. 6.

According to the exemplary process described herein, the backup software 10 is configured to back up data stored in memory 22 to a data archive 56 of a storage device (also described below for FIG. 6), for example, or it can be backed up to a remote storage device, such as in a data cloud, designated by numeral 60, and ultimately stored in a storage device. The archive storage 56 may be any type of device for storing digital information such as a hard drive, flash memory, disk, or tape. According to one aspect, the storage device may use an append-only storage scheme where the data is only added to and not overwritten.

Figure 1B:
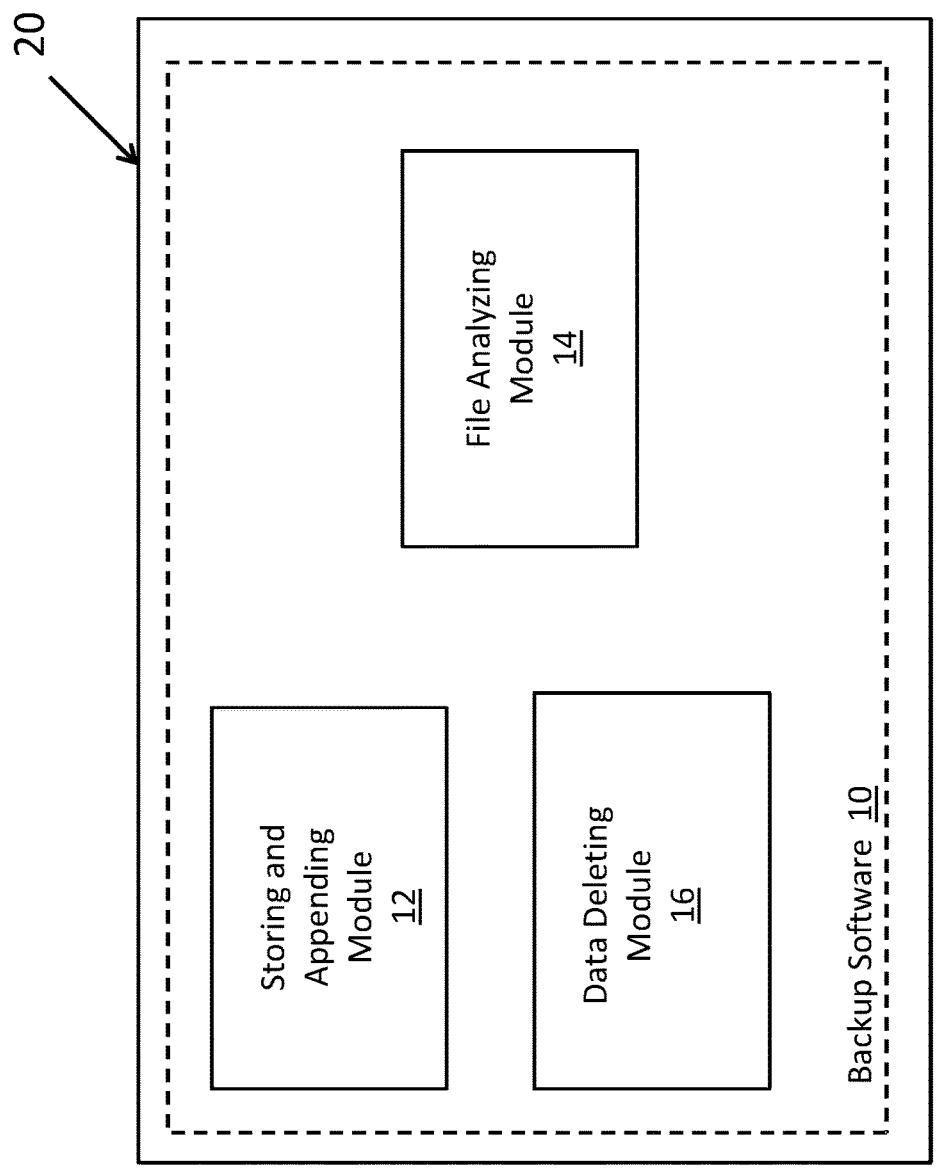
FIG. 1B illustrates a block diagram of a computer for incrementally performing a data backup according to an exemplary aspect.

FIG. 1B illustrates a block diagram of a computer for incrementally performing a data backup according to an exemplary aspect. In particular, the computer 20 shown in FIG. 1B illustrates a more detailed view of the client computer 20 of the system described above with respect to FIG. 1A.

As shown in FIG. 1B, the computer 20 includes the backup software 10 (i.e., a data backup data software module) that can include storing and appending module 12, file analyzing module 14, and data deleting module 16. The operations or algorithms performed for each of these modules will be described in detail below. However, according to the exemplary aspect, the storing and appending module 12 is configured to generate the incremental backups of portions of the data as well as add or append data to the dataset. More particularly, the storing and appending module 12 is configured to an initial complete backup of a dataset in the electronic memory (e.g., data archive 56 and/or data cloud 60) prior to storing a first incremental data backup of the first portion of the dataset. Subsequently, the storing and appending module 12 is further configured to store a first incremental data backup of a first portion of the dataset into electronic memory, where the first incremental data backup includes an unmodified portion of the dataset and a modified portion of the dataset.

The file analyzing module 14 is further provided to determine whether the first incremental data backup is a complete backup of the dataset. If the first incremental data backup is not a complete backup of the dataset, the file analyzing module 14 is further configured to store one or more subsequent incremental data backups of a second portion of the dataset into the electronic memory, where one or more of the subsequent incremental data backups includes a second unmodified portion of the dataset and a second modified portion of the dataset. According to one aspect, the second modified portion of the dataset that is stored as part of a subsequent incremental data backup in the electronic memory is determined after storing the first incremental data backup of the first portion of the dataset in the electronic memory.

According to one further aspect, the file analyzing module 14 is further provided to determine whether the first incremental data backup and one or more subsequent incremental data backups comprise the complete backup of the dataset. In this instance, if the incremental and subsequent incremental data backups form a complete backup of the dataset, the data deleting module 16 is configured to delete the initial complete backup of the dataset from the electronic memory.

Figure 2:
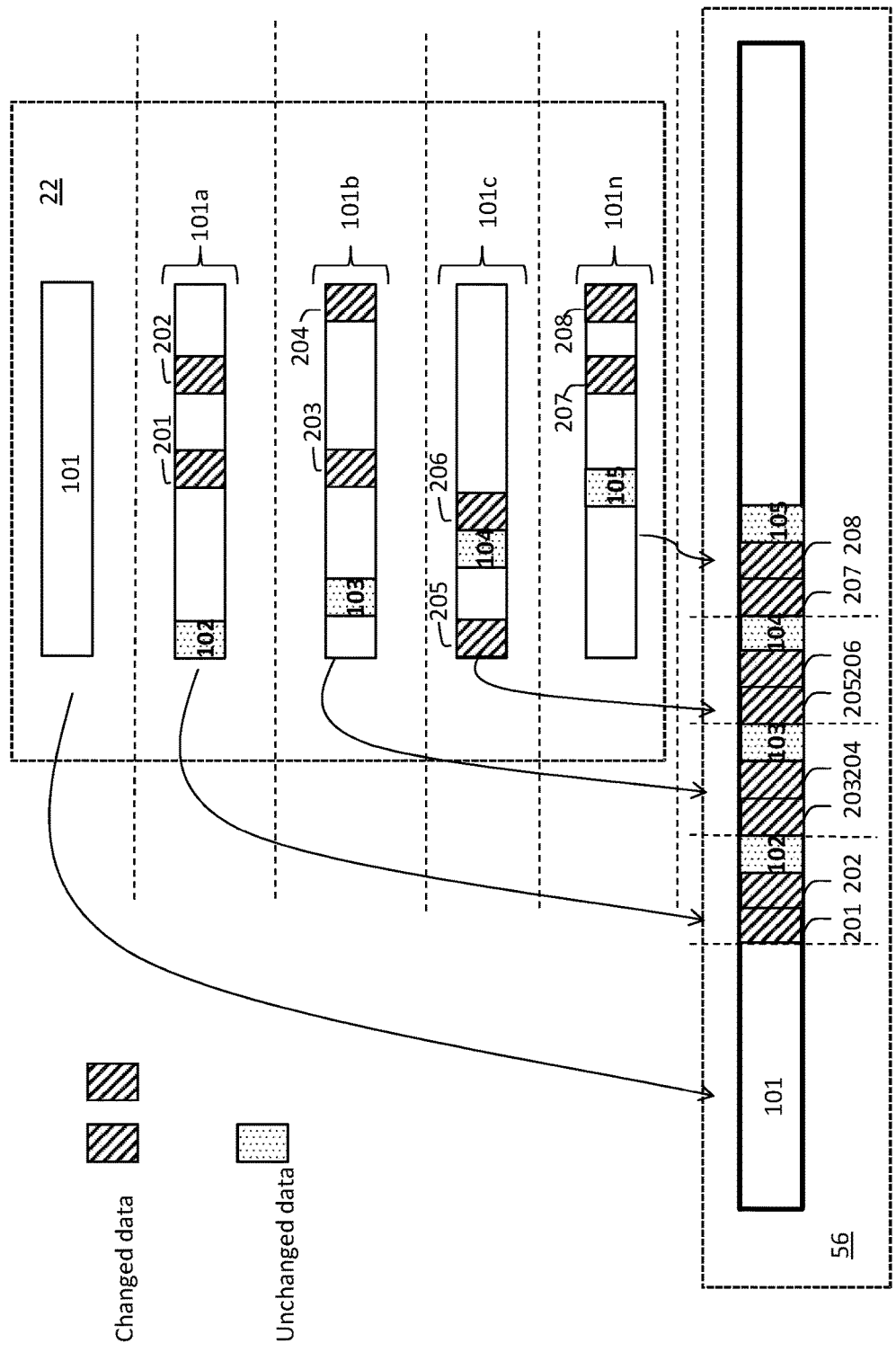
FIG. 2 illustrates a block diagram for providing an incremental data backup according to an exemplary aspect of the disclosure herein.

FIG. 2 illustrates a block diagram for providing an incremental data backup according to an exemplary aspect of the disclosure herein. As shown, FIG. 2 illustrates memory 22 that contains the data to be backed up (as described above) as well as the archive storage 56 for backing up the data. An initial step of the process, the backup software 10 (i.e., the storing and appending module) may be configured to perform a full backup of the dataset 101 of interest (i.e., an initial full backup). As shown, the initial full backup 101 is sent from the memory 22 to the archive storage 56 as should be understood to one skilled in the art. According to one aspect, this initial backup can be accomplished remotely by the backup software 10 as described above, or through so-called initial seeding. That is, initial storage of the user data in online storage, for example, by sending a hard drive with all of the dataset 101 to a data center to avoid having to send large amounts of data over a relatively slow Internet channel.

After the initial dataset 101 is sent to the archive storage 56 for backup, the backup software 10 (i.e., the storing and appending module) may be configured to perform one or more incremental backups of portions of the dataset in the memory 22. The incremental backups of portions of the data are annotated as 101a, 101b, 101c and 101n. It should be appreciated that these four incremental backups of data are shown for illustrative purposes, but the disclosed system and method is not in any way limited to a specific number of incremental backups of data. Moreover, it should be appreciated that each incremental backup of data can be generated automatically by the computer (such as periodically) or by a user or the like.

As further shown in FIG. 2, accordingly to the exemplary system and method, the incremental backups of data may be "append-only" storage according to an exemplary aspect where each of the portions of data backups 101a, 101b, 101c and 101n are added to the initial dataset 101 and not overwritten. One skilled in the art would understand such append-only storage can be a tape drive for example.

As further shown, each of the incremental portions of data backups 101a, 101b, 101c and 101n are copied to the archive storage 56 for backup as appended to the initial dataset. According to an exemplary aspect, each incremental data backup includes changed (also referred to as modified) blocks of data, which can be portions of the data that have changed from the initial dataset 101. Furthermore, each incremental data backup also includes an unchanged (i.e., unmodified) portion of the initial set of data 101 that has not changed since the last full data backup, for example. In other words, the unchanged portion of data will be an unchanged or unmodified portion of the initial dataset 101.

In the example shown in FIG. 2, the incremental data backup 101a includes an unchanged portion of data 102 (indicated by stippling) as well as changed or modified portions of data 201 and 202, i.e., blocks of data (files), which are indicated by cross hatching. Thus, according to the exemplary aspect, the incremental data backup 101a, including data blocks 102, 201 and 202, is copied in archive storage 56 as appended data to the initial full data backup, i.e., dataset 101. According to one aspect, the system and method described herein can identify the changed or modified portions of data 201 and 202 by comparing hashes of the data at certain periods of time as would be understood to one skilled in the art.

Similar processes can be performed for each of incremental data backups 101b, 101c and 101n. As shown, incremental data backup 101b includes changed portions of data 203 and 204 and unchanged portion of data 103. Moreover, incremental data backup 101c includes changed portions of data 205 and 206 and unchanged portion of data 104 and incremental data backup 101n includes changed portions of data 207 and 208 and unchanged portion of data 105.

According to an exemplary aspect, each of these subsequent incremental backups of portions of the dataset is performed periodically by the backup software 10 or as set by the user or system administrator. Each of the new portions of data (i.e., the changed/modified portions of data) includes data that was changed since the previous backup. For example, the changed portions of data 203 and 204 of incremental data backup 101b can include data that has been changed from the initial dataset 101 and/or the incremental data backup 101a since the initial incremental data backup 101a was copied to the archive storage 56.

In addition, according to the exemplary aspect as described, each of the incremental data backups 101a, 101b, 101c and 101n includes an unchanged portion of the initial dataset 101. More specifically, when the first incremental data backup 101a is copied to the archive storage 56, the incremental data backup 101a includes the unchanged portion of data 102 that is at least a portion of the initial dataset 101. Next, when the second incremental data backup 101b is copied to the archive storage 56, the incremental data backup 101b includes a second unchanged portion of data 103 that includes another portion of the initial dataset 101. This process is repeated for each subsequent incremental data backup copied to the archive storage 56.

According to the exemplary aspect, various schemes may be used for selecting the unchanged (original) data (e.g., unmodified data portions 102, 103, 104 and 105) to be stored in the archive storage 56 as part of the incremental backup. For example, if the archive storage 56 is a disk and the data is stored thereon, data portions can be taken in order moving from the start of the disk moving to the end of the disc. Thus, the unchanged data portions are building a complete set of the initial dataset 101 except for those portions of data that have been changed and are also included in the incremental data backups. Moreover, according to one aspect, the amount of unchanged data taken during each incremental backup session can vary depending on the demands of the particular application, such as criticality of the stored data, the bandwidth of the channel over which backup occurs, and so on. For example, if the incremental data backup only includes a small portion of changed data, then the system may include a larger portion of the unchanged data in that incremental backup and vice versa.

It should be understood that by providing incremental data backups that include both changed portions of data as well as the unchanged, the system is continuously building a new and complete backup set of data that is appended to the initial dataset 101 stored in the archive storage 56. Once the new set of data is complete, the new set of backup data stored in archive storage 56 will include all changed portions of data as well as those portions of data that have been unchanged since the initial dataset was initially stored. This result will be discussed in more detail in the following figures.

Figure 3:
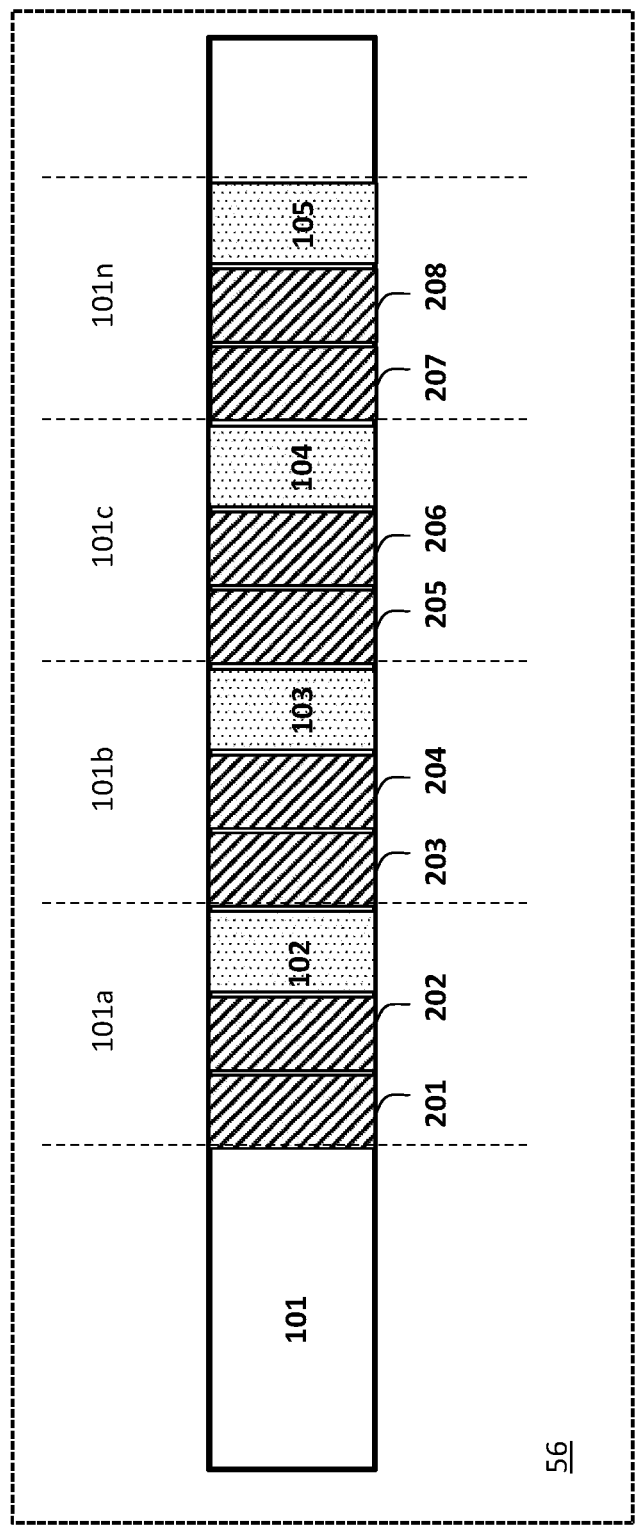
FIG. 3 illustrates a full backup of the initial dataset 101 as described above with respect to FIG. 2.

FIG. 3 illustrates a full backup of the initial dataset 101 as described above with respect to FIG. 2. In particular, the archive storage 56 includes each of the incremental data backups 101a, 101b, 101c and 101n, which can be considered a full data backup to the initial dataset 101, but include all changed portions of data 201-208 as well as the unchanged portions 102-105 as described above. Again, as should be understood to one skilled in the art, the number to incremental data backup sessions and/or the amount of time required to create the new full backup will depend on the needs of a particular application, including the size of the initial set of data 101, for example. According to one aspect, each of the incremental data backups 101a, 101b, 101c and 101n, is set to the same predetermined size (e.g., 256 KB). In an alternative embodiment, the incremental data backups 101a, 101b, 101c and 101n, can have varying sizes accordingly.

In conjunction with all the incremental backups, including the changed portions of data 201-208, the present algorithm allows full restoration of all user data. This is because the incrementally added data no longer depends on the initial backup 101, but instead includes all changed portions of the data as well as the portions of the data that have not been changed, i.e., portions 102-105. According to one aspect, once the full backup set of data has been copied to the archive storage 56, the initial set of backup data 101 is no longer needed and can be deleted to free space in the memory. It should be appreciated that the full backup set of data that includes incremental data backups 101a, 101b, 101c and 101n will be considered complete once these incremental data backups are deemed to include all unchanged portions of data (e.g., data portions 102-105) that make up a complete set of the initial dataset 101, except for those portions of data that have been changed. This determination can be made by a hardware processor of either the computer requesting the data backup or the processor creating the data backup on the archive storage 56, for example, as would be understood to one skilled in the art.

FIGS. 4A and 4B illustrate the memory of the archive storage 56 before and after the incremental data backup is complete according to an exemplary aspect. In particular, before the incremental backup operation is completed, all of the changed data portions of the incremental backups 201-208 relate (i.e., they are mapped) to the initial full backup 101 as shown in FIG. 4A. Once the incremental backup operation is completed, all of the changed data portions of the incremental backups 201-208 relate to the "distributed" portions 102, 103, 104, and 105 of the incremental backups (i.e., the unchanged portions of the initial dataset 101) rather than the initial dataset 101 itself. The relationship between the incremental backups 201-208 and the "distributed" portions 102, 103, 104, and 105 of the incremental backups can be stored as metadata, for example. Thus, as described above, the initial backup dataset 101 can be deleted at this time and recovery of the dataset can be based solely on the incremental backup data that includes incremental data backups 101a, 101b, 101c and 101n.

According to one exemplary aspect, for each full and incremental backup, the disclosed system and method store, along with the data, metadata information that records the location of the data in the archive storage 56. For example, during the initial full backup of the dataset 101, the addressing could be given by the relationship of blocks 0-100 have an offset (0). Then, for example, if at some point in time, block 10 (solely an example) is modified and its address respectively changed (because it was a copied incremental value), the new addressing can be given by the relationship that blocks 0-9 have an offset (0), block 10 has an offset (120) and blocks 11-100 have an offset (11). Thus, the metadata (e.g., the offset information) tracks the location of the data (i.e., the data blocks) relative to each other and can subsequently use this information to recreate a full dataset based solely on the incremental backup, assuming the backup has been completed.

According to one exemplary aspect, when all the data having offsets in the range from 0 to 100 has been transferred (so that there is a complete new full backup), the metadata no longer contains references to these addresses. Thus, the system can assume that the original address space is available and can be used for new recordings. Advantageously, when this method is used in conjunction with append-only storage, it becomes possible to free space in the storage, allowing it to be re-used. This result can be particularly useful where tape drives and any other linear devices such as writable optical disks with high density and other the append-only recording mode may be limited by the physical properties of the drive.

Figure 5:
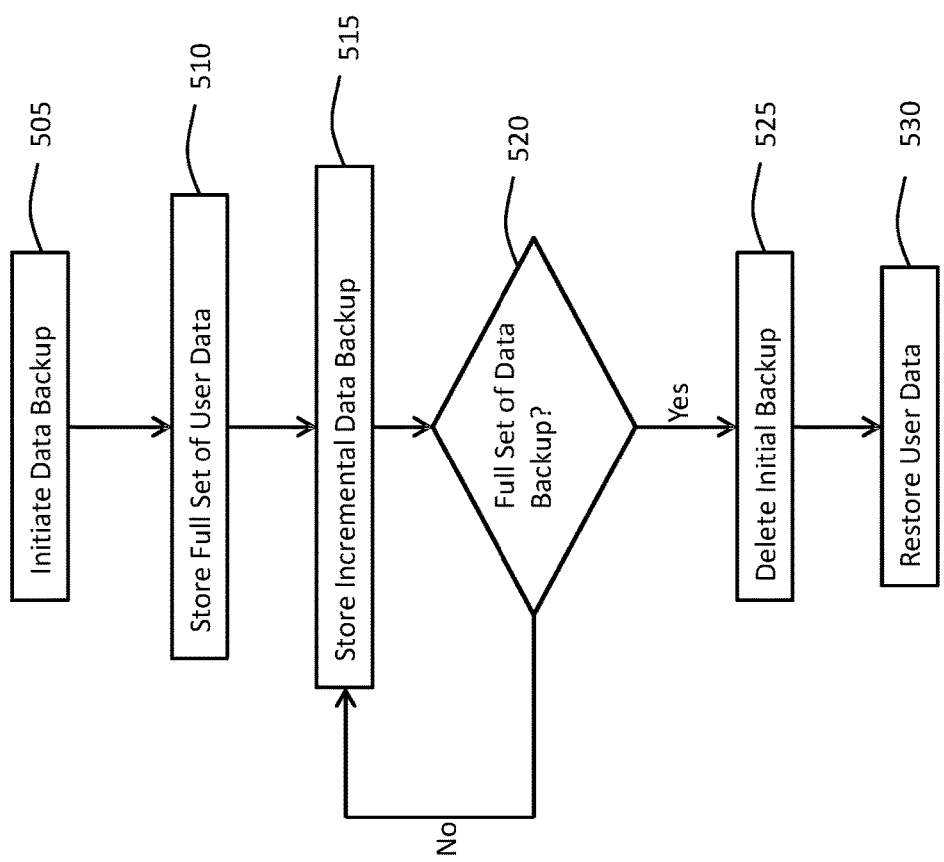
FIG. 5 illustrates a method for incrementally performing a full data backup according to an exemplary aspect.

FIG. 5 illustrates a method for incrementally performing a full data backup according to an exemplary aspect. As shown, initially at Step 505, the method determines to perform a data backup of a memory 22 of a computer 20, for example. Next, at Step 510, a full set of the data 101 on the memory 22 is copied to a second memory for data backup, which can be archive storage 56, a data cloud 60 or the like as would be understood to one skilled in the art. The method will be described as performing the data backup on the archive storage 56 hereinafter, but should not be so limited in any way. Furthermore, the creation of the full set of data 101 can be performed by the storing and appending module, for example.

Once the initial set of data 101 is copied to the archive storage 56, the method will determine at Step 515 to perform a first incremental data backup of the data. This step can be performed by the storing and appending module, for example. As noted above, this incremental backup can be performed periodically after a predetermined period of time, in response to a user request, in response to a determination that a portion of data of the initial set of data 101 has been changed, or the like. The initial incremental backup can be incremental data backup 101a and includes an unchanged portion of data 102 as well as changed portions of data 201 and 202, according to an exemplary aspect. According to one aspect, the incremental data backup 101a is copied as appended data to the initial full dataset 101 stored in archive storage 56.

Next, the method will determined whether a new full backup of the dataset has been copied into archive storage 56 at Step 520. In one aspect, the step is performed by the file analyzing module 14, for example. According to one exemplary aspect, this determination is made if the unchanged data portions of the incremental data backup represent all of the unchanged portions of the initial full dataset 101. According to another exemplary aspect, when the metadata no longer contains references for the data having offsets in the range from 0 to 100, as described above, the system can assume that a full data backup has been created. In other words, the system will know the entire size of the dataset 101 has been updated when all offsets have been accounted for according to the exemplary aspect.

As further shown in FIG. 5, if the method determines a full backup set of data has not been created, the method returns to Step 515 a subsequent incremental data backup is copied to the archive storage 56, as described above. This process is created until the method determines that a full backup set of data has indeed been created at Step 520. If so, the method proceeds to Step 525 and deletes the initial set of data 101 from the archive storage 56. This step can be performed by the data deleting module 16 of the backup software 10, for example. It should be appreciated that Step 525 of the disclosed method is optional and advantageously frees up memory space on the data archive for subsequent use as would be understood to one skilled in the art. Finally, as further shown, the method can perform Step 530, which is a restoration of the data on the memory 22 of the computer 20 using the full backup set of data that has been created according to the disclosed method.

Figure 6:
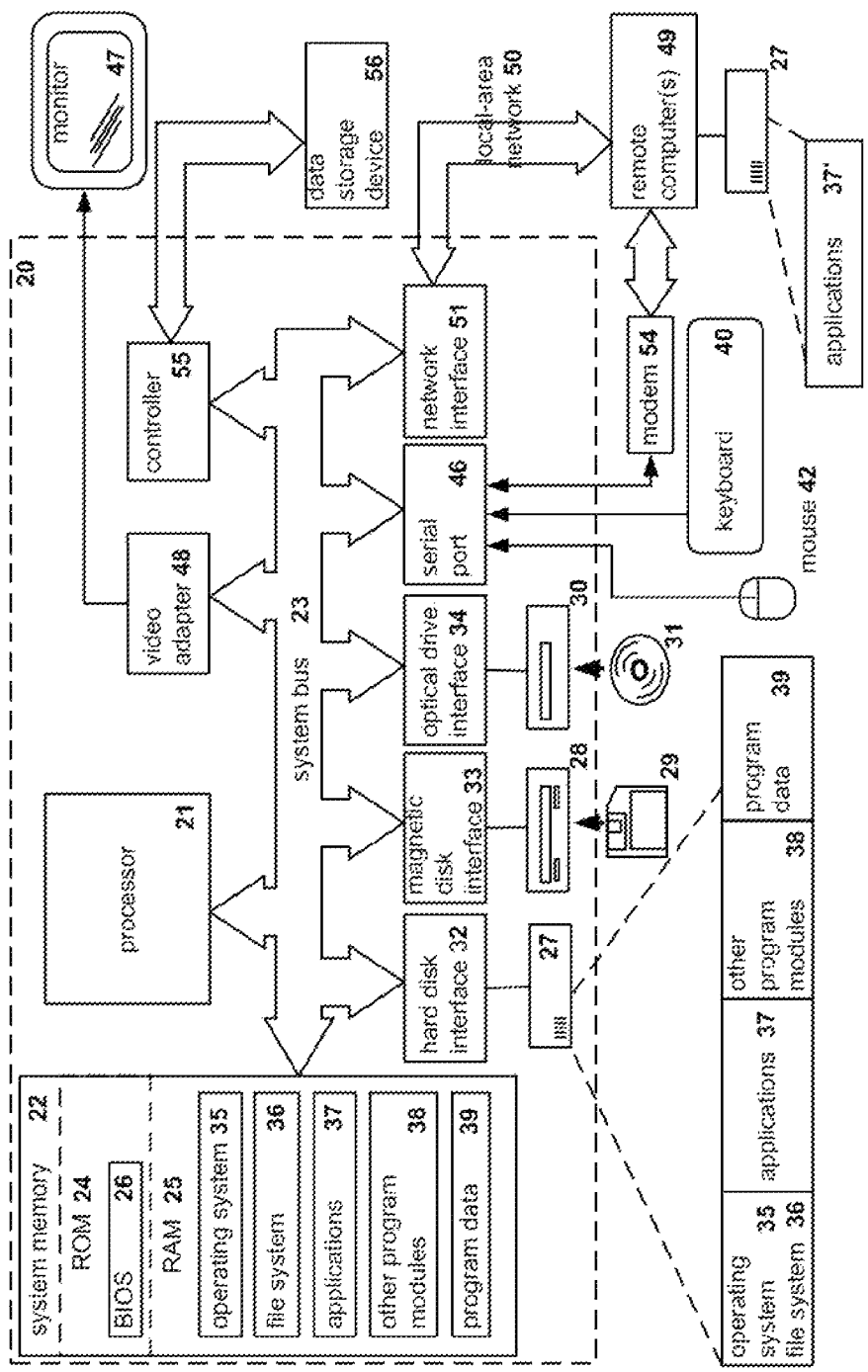
FIG. 6 illustrates an example of a general-purpose computer system on which the disclosed systems and method can be implemented.

FIG. 6 illustrates an example of a general-purpose computer system (which may be a personal computer or a server) on which the disclosed systems and method can be implemented according to an example aspect. It should be appreciated that the detailed general-purpose computer system can correspond to the computer 20 and memory 22 as described above with respect to FIG. 1A. Moreover, the processor 21 of computer 20 can be configured to execute each of the storing and appending module 12, the file analyzing module 14, and the data deleting module 16, described above with respect to FIG. 1B. Furthermore, the archive storage is illustrated as remote computer information media 56, as described below, but such archive storage can be any type of electronic memory capable of storing backup copies of electronic data as would be understood to one skilled in the art.

As shown in FIG. 6, the computer system 20 includes the processor or central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3.

Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for performing data backup comprising:
   storing an initial complete backup of a dataset in an electronic memory;
   storing a first incremental data backup of a first portion of the dataset in an electronic memory, wherein the first incremental data backup is less than the complete backup of the dataset and includes a first unmodified portion of the dataset and a first modified portion of the dataset;
   storing a second incremental data backup of a second portion of the dataset in the electronic memory, wherein the second incremental data backup includes: a second unmodified portion of the dataset different than the first unmodified portion of the dataset and a second modified portion of the dataset;
   determining, by a processor, whether the first and second incremental data backups together comprise the complete backup of the dataset; and
   if the first and second incremental data backups do not comprise the complete backup of the dataset, storing at least one subsequent incremental data backup of a subsequent portion of the dataset in the electronic memory, wherein the at least one subsequent incremental data backup includes both an additional unmodified portion of the dataset and an additional modified portion of the dataset.

2. The method of claim 1, wherein the storing of the first incremental data backup of the first portion of the dataset in the electronic memory comprises appending the first incremental data backup to the initial complete backup of the dataset.

3. The method of claim 1, wherein the additional modified portion of the dataset that is stored as part of the at least one subsequent incremental data backup in the electronic memory is determined after the storing of the first and second incremental data backups of the dataset in the electronic memory.

4. The method of claim 1, further comprising determining, by the processor, whether the first and second incremental data backups and the at least one subsequent incremental data backup comprise the complete backup of the dataset.

5. The method of claim 4, further comprising deleting the initial complete backup of the dataset from the electronic memory if the first and second incremental data backups and the at least one subsequent incremental data backup comprise the complete backup of the dataset.

6. The method of claim 1, further comprising:
   associating the first, second and additional modified portions of the dataset with the initial complete backup of the dataset in the electronic memory until the processor determines that the first and second incremental data backups and the at least one subsequent incremental data backup comprise the complete backup of the dataset; and associating the first, second and additional modified portions of the dataset with the first, second and additional unmodified portions of the dataset when the processor determines that the first and second incremental data backups and the at least one subsequent incremental data backup comprise the complete backup of the dataset.

7. A system for performing data backup, the system comprising:

an electronic memory; and a processor configured to:
store an initial complete backup of a dataset in the electronic memory;
store a first incremental data backup of a first portion of the dataset in an electronic memory, wherein the first incremental data backup is less than the complete backup of the dataset and includes a first unmodified portion of the dataset and a first modified portion of the dataset,
store a second incremental data backup of a second portion of the dataset in the electronic memory, wherein the second incremental data backup includes: a second unmodified portion of the dataset different than the first unmodified portion of the dataset and a second modified portion of the dataset,
determine whether the first and second incremental data backups together comprise the complete backup of the dataset,
if the first and second incremental data backups do not comprise the complete backup of the dataset, store at least one subsequent incremental data backup of a subsequent portion of the dataset in the electronic memory, wherein the at least one subsequent incremental data backup includes both an additional unmodified portion of the dataset and an additional modified portion of the dataset.

8. The system of claim 7, wherein the processor is further configured to store the first incremental data backup of the first portion of the dataset by appending the first incremental data backup to the initial complete backup of the dataset.

9. The system of claim 7, wherein the additional modified portion of the dataset that is stored as part of the at least one subsequent incremental data backup is determined after the storing of the first and second incremental data backups of the dataset.

10. The system of claim 7, wherein the processor is further configured to determine whether the first and second incremental data backups and the at least one subsequent incremental data backup comprise the complete backup of the dataset.

11. The system of claim 10, wherein the processor is further configured to delete the initial complete backup of the dataset from the electronic memory if the first and second incremental data backups and the at least one subsequent incremental data backup comprise the complete backup of the dataset.

12. The system of claim 7, wherein the processor is further configured to:
associate the first, second and additional modified portions of the dataset with the initial complete backup of the dataset in the electronic memory until the processor determines that the first and second incremental data backups and the at least one subsequent incremental data backup comprise the complete backup of the dataset; and
associate the first, second and additional modified portions of the dataset with the first, second and additional unmodified portions of the dataset when the processor determines that the first and second incremental data backups and the at least one subsequent incremental data backup comprise the complete backup of the dataset.

13. A non-transitory computer readable medium storing computer executable instructions for performing data backup, including instructions for:
storing an initial complete backup of a dataset in an electronic memory;
storing a first incremental data backup of a first portion of the dataset in the electronic memory, wherein the first incremental data backup is less than the complete backup of the dataset and includes a first unmodified portion of the dataset and a first modified portion of the dataset;
storing a second incremental data backup of a second portion of the dataset in the electronic memory, wherein the second incremental data backup includes: a second unmodified portion of the dataset different than the first unmodified portion of the dataset and a second modified portion of the dataset;
determining whether the first and second incremental data backups together comprise the complete backup of the dataset; and
if the first and second incremental data backups do not comprise the complete backup of the dataset, storing at least one subsequent incremental data backup of a subsequent portion of the dataset in the electronic memory, wherein the at least one subsequent incremental data backup includes both an additional unmodified portion of the dataset and an additional modified portion of the dataset.

14. The non-transitory computer readable medium of claim 13, further including instructions for determining whether the first and second incremental data backups and the at least one subsequent incremental data backup comprise the complete backup of the dataset.

15. The non-transitory computer readable medium of claim 14, further including instructions for deleting the initial complete backup of the dataset from the electronic memory if the first and second incremental data backups and the at least one subsequent incremental data backup comprise the complete backup of the dataset.

* * * * *